United States Patent
Bingham et al.

(10) Patent No.: US 11,671,390 B2
(45) Date of Patent: Jun. 6, 2023

(54) EMAIL WIDGETS

(71) Applicant: The Travelers Indemnity Company, Hartford, CT (US)

(72) Inventors: Andrew J. Bingham, Naperville, IL (US); Anastasia Shekhter, South Windsor, CT (US); Gregory J. Richmond, Salem, CT (US); Jenn Van Scoter, Canton, CT (US); Josh R. Slater, Hebron, CT (US); Alyssa M. Branday, Cromwell, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 0 days.

(21) Appl. No.: 17/382,648

(22) Filed: Jul. 22, 2021

(65) Prior Publication Data

US 2023/0024204 A1 Jan. 26, 2023

(51) Int. Cl.
*H04L 51/10* (2022.01)
*H04L 51/02* (2022.01)
*G06F 3/0482* (2013.01)

(52) U.S. Cl.
CPC .............. *H04L 51/10* (2013.01); *H04L 51/02* (2013.01); *G06F 3/0482* (2013.01)

(58) Field of Classification Search
CPC ......... H04L 51/10; H04L 51/02; H04L 51/18; G06F 3/0482
See application file for complete search history.

(56) References Cited

U.S. PATENT DOCUMENTS

| 7,720,696 | B1* | 5/2010 | Berger | G16H 50/20 600/300 |
|---|---|---|---|---|
| 10,839,354 | B1 | 11/2020 | Hughes et al. | |
| 11,036,353 | B1 | 6/2021 | Hughes et al. | |
| 11,329,933 | B1* | 5/2022 | Kiyanda | H04L 51/56 |
| 2011/0196933 | A1* | 8/2011 | Jackson | H04L 51/52 709/206 |
| 2012/0042025 | A1* | 2/2012 | Jamison | G06Q 30/0242 709/206 |
| 2015/0324849 | A1* | 11/2015 | Datar | G06Q 10/107 705/14.55 |
| 2017/0140467 | A1* | 5/2017 | Neag | G06Q 30/02 |
| 2018/0219830 | A1* | 8/2018 | O'Brien | H04L 51/48 |
| 2018/0315077 | A1* | 11/2018 | Donnelly | G06Q 10/06398 |
| 2021/0344633 | A1* | 11/2021 | Bar-on | H04L 51/42 |
| 2022/0070296 | A1* | 3/2022 | Friio | H04M 3/5183 |

\* cited by examiner

*Primary Examiner* — Austin J Moreau
(74) *Attorney, Agent, or Firm* — Cantor Colburn LLP

(57) ABSTRACT

A system includes a processing device and memory device configured to receive a widget insertion request associated with an email message. The processing device is further configured to customize one or more options of the widget based on one or more user selections. The processing device can also insert the widget into a body of the email message. The widget provides one or more interactive services to a recipient of the email message based on the one or more options. The processing device is configured to send the email message with the widget to the recipient to allow the recipient to interact with the widget upon receiving the email message.

26 Claims, 11 Drawing Sheets

EMAIL WIDGETS

BACKGROUND

Email systems are typically used to send messages with or without attachments to one or more recipients. A user may be able to change the formatting of text or insert image objects within an email message. Documents, image files, audio files, video files, and/or other file types may be included with an email message as attachments. Accessing attachments may require that the recipient download the attachments and open the attachments through separate applications configured to handle each of the file types of the attachments. The attachments may not be directly visible to the email recipient upon receipt and, in some cases, may not be seen or opened by the recipient. Thus, a user desiring to include more than text or embedded images in the body of the email message may be limited in how additional content can be sent to and viewed by one or more recipients. Further, sending additional content in separate file attachments can consume more processing and storage resources, as each file attachment may have specific file wrapper and formatting constraints. The attachments are also typically limited to previously generated content that was created and saved prior to preparing the email message.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Figure 1:
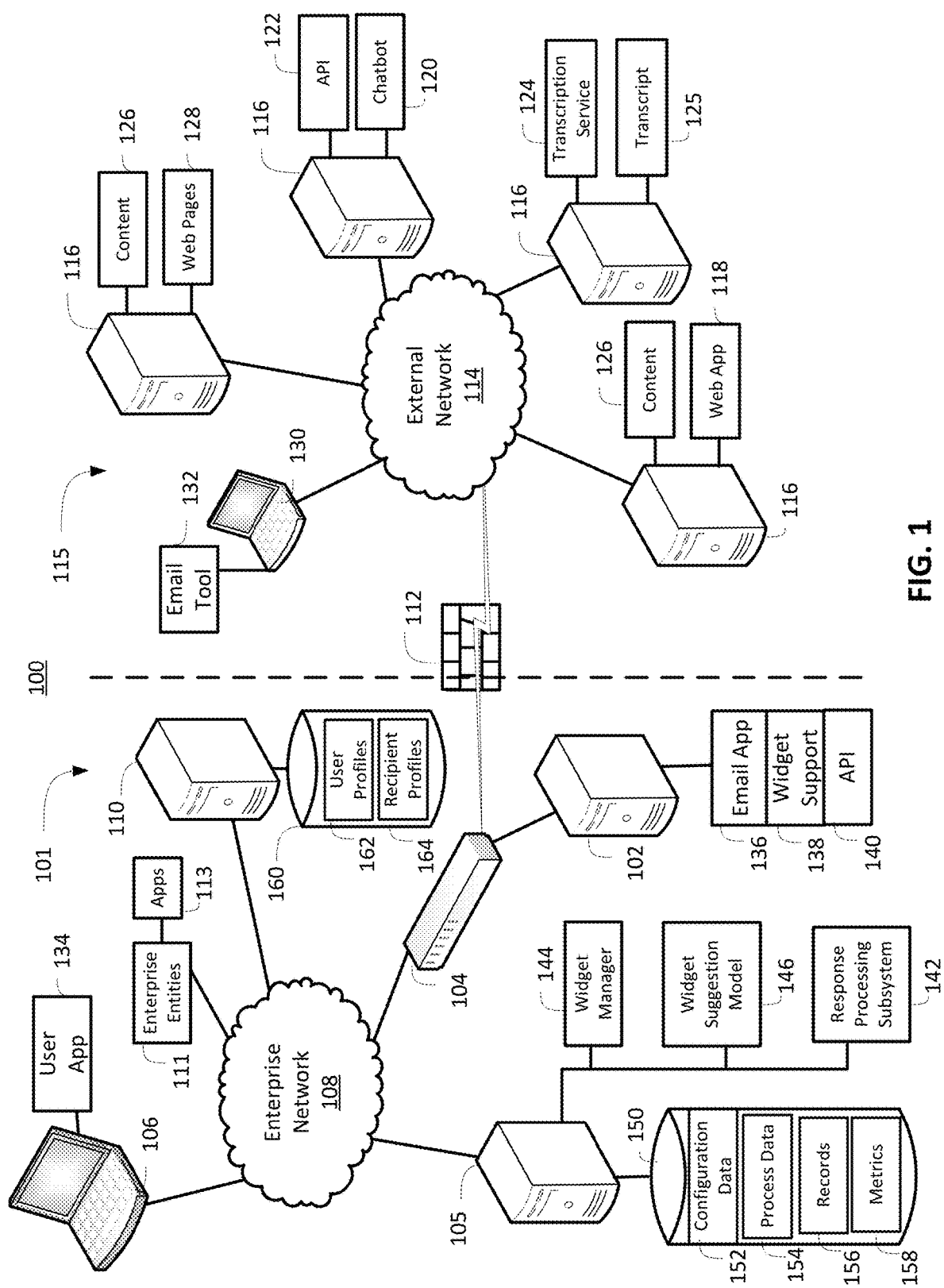
FIG. 1 depicts a block diagram of a system according to some embodiments of the present invention.

According to an embodiment, a system for email widget creation and usage is provided. The system may be used for various practical applications of inserting an interactive widget into an email message to support data entry directly into an email message by the recipient. As used herein, a "widget" can comprise an application or component of an interface that enables an email recipient to perform a function or access a service, where the widget is directly embedded within the email message. A widget can include underlying code to trigger interactions, information collection, and calls to other components, which differs from email templates that may include text, images, and links as background material into which a user types a message. A widget within an email message can also support direct user interaction with the recipient through static content, dynamic content, and links. The links can trigger further interactions through a web page, application, or chatbot. The system simplifies user interactions, for example, by allowing a recipient to determine whether any linked content available through the widget is of interest before engaging with further interactions outside of the email message. Interactions with the widget embedded in the email message can be driven by the recipient intentionally making a selection or providing a response before further actions are initiated. This can reduce data transfer and network bandwidth impacts by limiting interactions to those expressly initiated by the recipient through the widget. Information collected through the widget can be pushed to another system, for instance, to collect and integrate data into one or more connected systems. Data can be passed from the widget to other systems without direct input by a user of the widget or data can be passed in response to user input.

Embodiments can allow a user generating an email message to customize and selectively insert a widget into an email message. In some embodiments, a widget suggestion model can apply machine-learning techniques to suggest a widget type and configuration settings for widget insertion based on several factors. For instance, where the email messages are part of a defined process flow, the widget suggestion model can track and predict a portion of the process flow that the email message is directed towards and suggest a widget type for insertion. Tracking information about the user based on a user profile and/or information about the recipient based on a recipient profile can improve widget suggestion accuracy. Further, upon identifying the user and recipient, one or more parameters of the suggested widget can be prefilled to minimize the additional customizations to be performed prior to sending the email message that includes the widget. Ensuring that the widget is configured appropriately for the recipient and the associated portion of the process flow can reduce extra processing and message exchanges that could occur if the widget was incorrectly configured or routed to an incorrect recipient.

Turning now to FIG. 1, a system 100 is depicted upon which email widget creation and usage may be implemented. The system 100 can include an enterprise network zone 101 including a mail server 102 coupled to a gateway 104 operable to establish communication with a data processing server 105, one or more user systems 106, one or more data storage servers 110, one or more enterprise entities 111, and/or other devices (not depicted) through an enterprise network 108. The gateway 104 may also establish communication with an external network 114, for instance, through a firewall 112, to send and receive data to a plurality of external servers 116 in an external network zone 115. The external servers 116 can each execute one or more applications and/or services. Examples of the applications and/or services can include, for instance, a web application 118, a chatbot 120, an application programming interface (API) 122, and/or a transcription service 124. Further, the external servers 116 can store various types of data and/or files, such as content 126 and web pages 128. The content 126 can include various types of data and/or user interface elements, such as information, images, video, audio, etc. One or more recipient systems 130 can also interface with the external network 114 and support sending and receiving of email messages through an email tool 132.

In embodiments, a user of a user system 106 can access a user application 134 locally or through the enterprise network 108 to interface with an email application 136 on the mail server 102. Widget support 138 can allow a widget to be inserted in an email message and sent from the mail server 102 to the email tool 132 of a recipient system 130 of the external network zone 115. The widget can allow the recipient to view selected content, provide user input, and trigger further actions directly from within the email message. For example, a widget may link to content 126 for display directly in the email message or can trigger interactions with the web application 118 or web pages 128. Further, user input to the widget may activate the chatbot 120 to interact with the recipient about one or more specific topics in a simulated conversation. The chatbot 120 can be configured with domain-specific information and use natural language processing to generate questions and collect responses from the recipient related to one or more topics. Interactions between the recipient and the chatbot 120 can be captured directly or analyzed by the transcription service 124 to capture the results in a transcript 125. The transcript 125 can be made available to or sent in a response email message back to a response processing subsystem 142. The response processing subsystem 142 can be part of the enterprise network zone 101, for instance, as part of the data processing server 105 or another processing system of FIG. 1. The web application 118 and/or web pages 128 can include a sequence of questions and responses, with results captured through the API 122 and returned to the response processing subsystem 142. In some embodiments, the widget is configured to open a sequence of web pages 128 that is dynamically selected based on one or more responses by the recipient.

An API 140 of the enterprise network zone 101 can interface with the API 122 and/or other components. For example, the API 122 can interact with one or more applications, such as web application 118, or web pages 128 launched by the widget, and capture one or more responses collected from the recipient. When a web page 128 is launched by the widget or populated in response to the widget, information can be prepopulated, such as form data, in response to data collected through the widget and/or gathered by the widget. The API 122 can trigger a follow-up action based on the one or more responses, for instance, by passing the one or more responses to the API 140, which can forward the one or more responses to the response processing subsystem 142 or filter the one or more responses if non-compliant with permission and/or security settings of the enterprise network zone 101. Follow-up actions can include triggering one or more applications 113 of the enterprise entities 111 to perform actions, such as engaging in interactions with the recipient system 130. The API 140 may also provide interface filtering on behalf of the one or more applications 113 to maintain security and integrity within the enterprise network zone 101.

In embodiments, the widget support 138 can interface with a widget manager 144 that creates and customizes the widget inserted in the email message sent to the recipient system 130. The widget manager 144 can be executed by the data processing server 105 or other processing system of the enterprise network zone 101. The widget manager 144 can access configuration data 152 that defines how the widget should be customized for the recipient. Configuration and customization of the widget can be performed based on user selections and/or determined by a widget suggestion model 146. Process data 154 can be used to define steps of process flows to assist in determining how the widget should be configured depending on how far along the process has progressed. Knowledge about the user sending the email message and the intended recipient of the email message can assist in determining how the widget should be configured and the current process step. User profiles 162 and recipient profiles 164 can be available, for instance, from a data storage system 160 of the data storage servers 110 or other such entity to guide the types of expected interactions. The user profiles 162 can define a role of the user, the authority level of the user, and other such information to assist in determining available types of requests or offers that can be passed through a widget. The recipient profiles 164 can define the role of a recipient, the authority level of the recipient, existing relationships between the recipient and the enterprise entities 111, and other such information to assist in determining available types of requests or offers that can be passed through a widget. For example, if the recipient profiles 164 indicate that the intended recipient has an existing relationship with one of the enterprise entities 111, then the widget manager 144 may warn the user or the widget suggestion model 146 may avoid suggesting a widget configuration that would conflict with the existing relationship.

As widgets are configured through the widget manager 144, inserted into email messages by the widget support 138, and sent by the email application 136, records 156 can be generated to track the activity and results. The response processing subsystem 142 can monitor the responses and capture associated data in the records 156. As follow-up actions are scheduled and/or other actions are taken based on the responses, the response processing subsystem 142 or another component can generate scheduling records as part of the records 156. To determine the success of the widgets as configured through the widget manager 144 and/or the widget suggestion model 146, metrics 158 can be tracked. Outcomes of follow-up actions, for instance, as performed through applications 113 of enterprise entities 111 can be logged as part of the metrics 158. Trending or other techniques can be used determine whether the widget configurations result in a greater or reduced success rate of engagement with recipients over time. This feedback can be used to fine tune the widget suggestion model 146. Tracking can include engagement rates, follow-up activities performed, status changes logged in the recipient profiles 164 with respect to the enterprise entities 111, and other such results. Although the configuration data 152, process data 154, records 156, and metrics 158 are all depicted within a data storage system 150 coupled to the data processing server 105, it will be understood that the configuration data 152, process data 154, records 156, and metrics 158 can be located at any accessible location within the system 100 and need not be co-located.

In embodiments, the enterprise network zone 101 can include a plurality of networked resources that may be distributed over multiple locations, where the networked resources are access-controlled by an enterprise. The external network zone 115 may link to networked resources that are outside of enterprise control and may be distributed over a wide geographic area.

Examples of algorithms that may be applied to train the widget suggestion model 146 can include one or more of: supervised learning, unsupervised learning, semi-supervised learning, and reinforcement learning. For instance, labeled training data can be provided to train the widget suggestion model 146 to find model parameters that assist in detecting unlabeled data in the data sets. Linear regression and linear classifiers can be used in some embodiments. Other embodiments may use decision trees, k-means, principal component analysis, neural networks, and/or other known machine-learning algorithms. To enhance learning, the widget suggestion model 146 can analyze the body of an email and/or attachments to assist in determining a type of interaction between the user and the recipient. The widget suggestion model 146 may use a combination of machine-learning techniques that can differ depending on whether the data set includes text, image data, video data, and/or audio data. For example, supervised learning with entity extraction can be used to learn text values, while generative adversarial networks can be used for image learning. For instance, a signature block of the email message may include embedded logos or images that identify a business unit. Message size may also be considered as part of the learning process, such as avoiding making widget suggestions when a message size exceeds a size threshold where the widget may have a higher likelihood of going unnoticed due to the large quantity of content already contained within the email message.

In the example of FIG. 1, each of the mail server 102, data processing server 105, user systems 106, data storage servers 110, external servers 116, and recipient systems 130 can include one or more processors (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100. Although depicted separately, one or more of the mail server 102, data processing server 105, user systems 106, and/or data storage servers 110 can be combined or further subdivided.

The user systems 106 and the recipient systems 130 may each be implemented using a computer executing one or more computer programs for carrying out processes described herein. In one embodiment, the user systems 106 and the recipient systems 130 may each be a personal computer (e.g., a laptop, desktop, etc.), a network server-attached terminal (e.g., a thin client operating within a network), or a portable device (e.g., a tablet computer, personal digital assistant, smart phone, etc.). It will be understood that while only a single instance of each of the user systems 106 and the recipient systems 130 is shown in FIG. 1, there may be multiple user systems 106 coupled to the enterprise network 108 and recipient systems 130 coupled to the external network 114 in embodiments.

Each of the mail server 102, data processing server 105, user systems 106, data storage servers 110, external servers 116, and recipient systems 130 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

Figure 2:
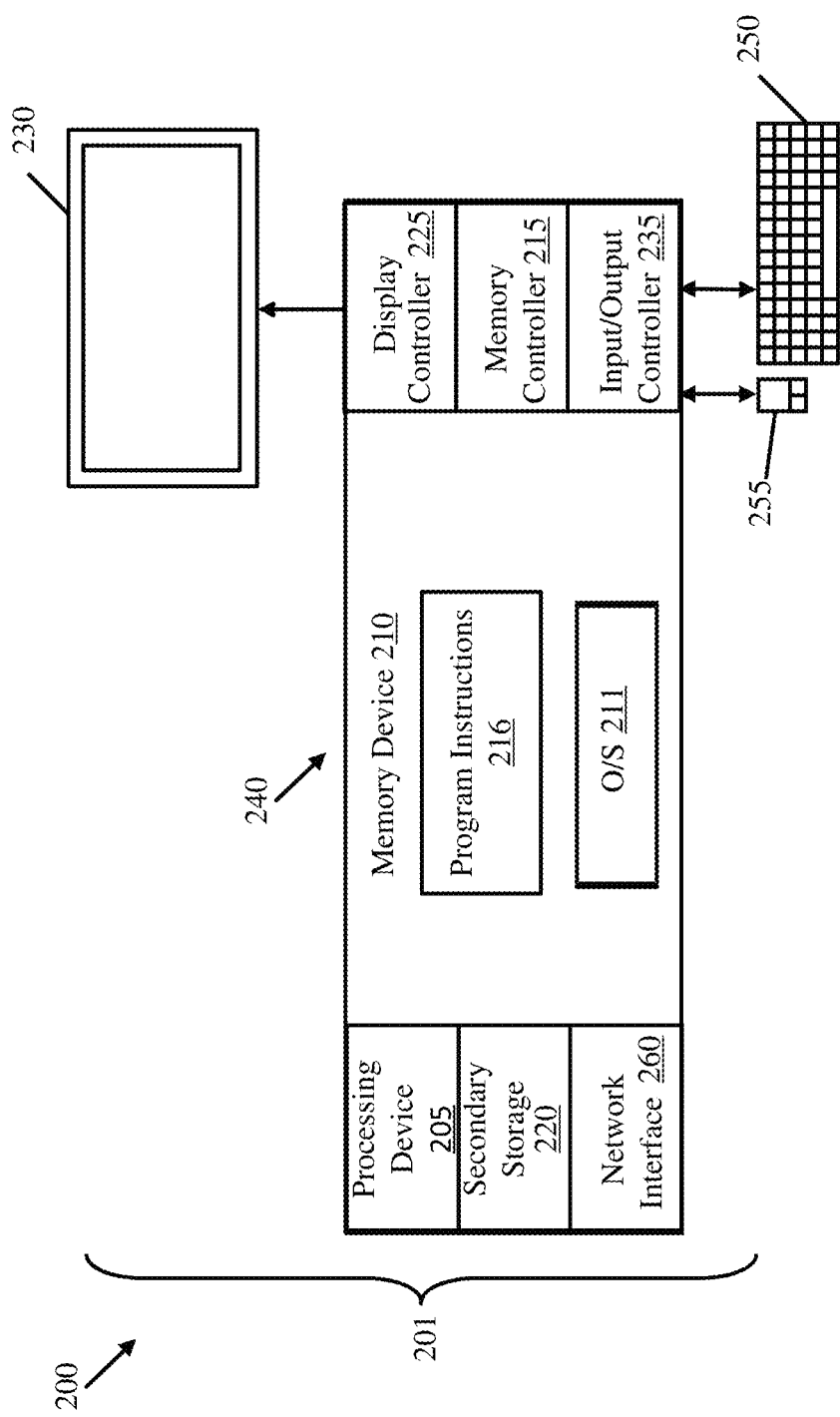
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the mail server 102, data processing server 105, user systems 106, data storage servers 110, external servers 116 and/or recipient systems 130 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the applications 113, web application 118, chatbot 120, API 122, transcription service 124, email tool 132, user application 134, email application 136, widget support 138, API 140, response processing subsystem 142, widget manager 144, and/or widget suggestion model 146 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106 or recipient systems 130 of FIG. 1, the network interface 260 can establish communication channels with at least one of the mail server 102, data processing server 105, or data storage servers 110 via the enterprise network 108 and/or with external servers 116 via external network 114.

Figure 3:
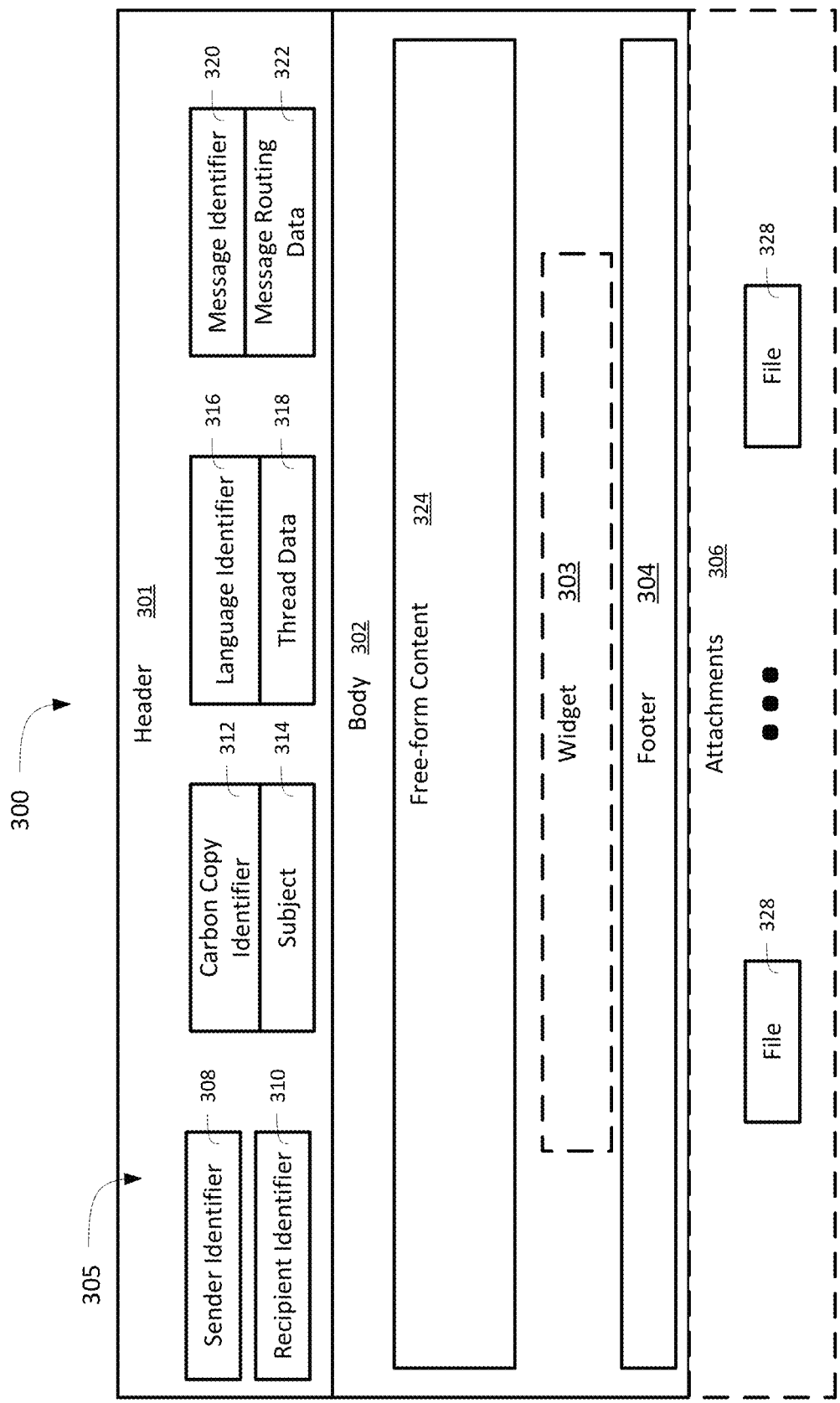
FIG. 3 depicts elements of an email message for widget insertion according to some embodiments of the present invention.

FIG. 3 depicts elements of an email message 300 for widget insertion according to some embodiments. The email message 300 can be generated by the email application 136 through the mail server 102 of FIG. 1 as an original message or response/forward of a previous message received at the mail server 102. The email message 300 can include a header 301, a body 302, a footer 304, and may also include attachments 306. The header 301 can include a plurality of correspondence data 305, such as a sender identifier 308, a recipient identifier 310, a carbon copy (cc) identifier 312, a subject 314, a language identifier 316, thread data 318, a message identifier 320, and message routing data 322. The sender identifier 308 can identify an email address of the originator of the email message 300. The recipient identifier 310 can be associated with an email address of an inbox of a recipient as accessed through the email tool 132 of FIG. 1. The carbon copy identifier 312 can identify one or more secondary recipients, which may include the email address of a different inbox, for example. The subject 314 can include descriptive text associated with the body 302. The language identifier 316 can identify the language of text in the body 302 and/or attachments 306. In embodiments with multiple language support, the language identifier 316 can be used to select between different languages for training the widget suggestion model 146 of FIG. 1. The thread data 318 can identify a message thread where a sequence of email messages 300 are related as part of a common topic or exchange of messages between multiple parties. The message identifier 320 can be used to identify the email message 300, for instance, as part of indexing and tracking by the response processing subsystem 142 and records 156 of FIG. 1. The message routing data 322 can indicate a path through the enterprise network zone 101 and the external network zone 115 that the email message 300 takes to reach the email tool 132 or mail server 102.

The body 302 of the email message 300 can include free-form content 324. Rather than being structured as a form with specific fields, the free-form content 324 can be formatted in natural language. For example, the free-form content 324 can be in sentences or phrases along with identifying information and data. The footer 304 can include a signature block, disclaimer text, or other such material. The attachments 306, if present, can include a variety of files 328 with multiple file types, such as text files, documents, spreadsheets, images, video, audio clips, and other such formats known in the art.

In embodiments, a widget 303 can be inserted in the body 302, for example, before the footer 304. The widget 303 can be inserted by widget support 138 as configured through the widget manager 144 and/or widget suggestion model 146 of FIG. 1. Insertion of the widget 303 can be triggered by a user selection, such as through a toolbar, menu, or selection through a touchscreen, keyboard, or mouse, for instance. Alternatively, the widget 303 can be automatically inserted without a user request. For example, a suggested version of the widget 303 can be inserted absent a specific user selection, and the widget 303 can be further customized or deleted by the user. The widget manager 144 and/or widget suggestion model 146 can use information populated in the email message 300 to assist in configuring and selecting a widget type for the widget 303. For example, the sender identifier 308 can be used to perform a lookup operation in the user profiles 162 to discover the role of the user generating the email message 300 and any associated constraints. Similarly, the recipient identifier 310 can be used to perform a lookup operation in the recipient profiles 164 to discover the role of the recipient intended to receive the email message 300 and any associated constraints. Information from the subject 314, free-form content 324, and/or attachments 306 can be used to determine a type of transaction in a process flow associated with process data 154 that the email message 300 is intended to address. Other data sources may also be accessed to determine configuration settings for the widget 303.

Figure 4A:
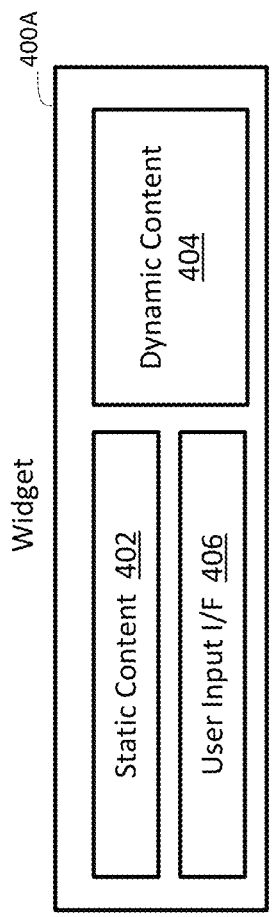
FIG. 4A depicts an example of a widget for insertion in an email message according to some embodiments of the present invention.

FIG. 4A depicts an example of a widget 400A for insertion in an email message according to some embodiments. The widget 400A is an example of widget structure that can be implemented as widget 303 of the email message 300 of FIG. 3. Widget 400A includes static content 402, dynamic content 404, and a user input interface 406. The static content 402 can include text or graphics that request a response of the recipient to be input through the user input interface 406. For example, the static content 402 can ask whether the recipient would be interested in a quote for a related product or service. The dynamic content 404 can include an active display element, such as a video display component that can play a video clip explaining more about the product or service upon a selection by the recipient. The dynamic content 404 can be externally sourced, such as part of content 126 on an external server 116. Linking to the content 126 accessible through external network 114 can reduce network traffic between the recipient system 130 and components of the enterprise network zone 101. The user input interface 406 can include simple yes/no options or allow the recipient to input data values through free-text input or selectable options. Although depicted with both static content 402 and dynamic content 404, some embodiments may include only static content 402 or only dynamic content 404.

Depending upon a selection through the user input interface 406, different follow-up actions can be triggered. For example, a "yes" selection may trigger a message to the API 122 or 140 to report the request to the response processing subsystem 142. A "no" selection may trigger one or more follow-up actions, such as checking whether the recipient would be interested in a phone call or chat session for more information. A phone call request can be reported back to the response processing subsystem 142 for scheduling. A chat request can trigger an interactive chat session with the chatbot 120. The chatbot 120 can ask targeted questions for information gathering and reporting back to the response processing subsystem 142. Transcription service 124 can be used to capture a record of the chat in transcript 125 to report back to the response processing subsystem 142. Question and answer process flows can be defined through the web application 118 and/or web pages 128 to support gathering of data and reporting of the results back to the response processing subsystem 142 for further processing.

Figure 4B:
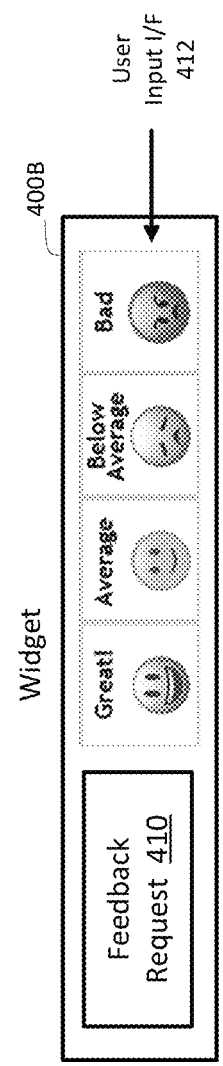
FIG. 4B depicts an example of a widget for insertion in an email message according to some embodiments of the present invention.

FIG. 4B depicts an example of a widget for insertion in an email message according to some embodiments. The widget 400B is an example of widget structure that can be implemented as widget 303 of the email message 300 of FIG. 3. Widget 400B includes a feedback request 410 and a user input interface 412. In the example of FIG. 4B, the widget 400B is depicted as a simple customer-service widget to collect opinions of recipients. The widget 400B can be keyed with underlying codes to track the user requesting the feedback and the recipient providing the feedback. Alternatively, the feedback requested through widget 400B may involve a product or service and need not be directly tied to the user initiating the feedback request.

Figure 4C:
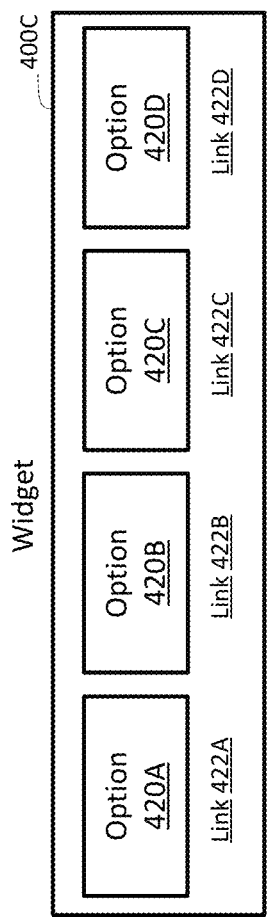
FIG. 4C depicts an example of a widget for insertion in an email message according to some embodiments of the present invention.

FIG. 4C depicts an example of a widget for insertion in an email message according to some embodiments. The widget 400C is an example of widget structure that can be implemented as widget 303 of the email message 300 of FIG. 3. Widget 400C includes a plurality of options 420A, 420B, 420C, 420D and links 422A, 422B, 422C, 422D. Each of the options 420A-420D can have an associated link 422A-422D to trigger further actions. The options 420A-420D can be individually selectable to view dynamic content from content 126 or support user input of one or more parameters. The links 422A-422D can trigger associated actions, such as requesting a quote for a product or service corresponding to the options 420A-420D. Similar to the example of FIG. 4A, selection of the links 422A-422D can trigger one or more interactions with the web application 118, chatbot 120, or web pages 128 with results reported back through the response processing subsystem 142.

Although the examples of FIGS. 4A, 4B, and 4C illustrate three types of widget configurations, it will be understood that many other configuration options for the widget 303 can be generated. Further, each of the widgets 400A, 400B, 400C can be customized with many different features as further described with respect to FIG. 5.

Figure 5:
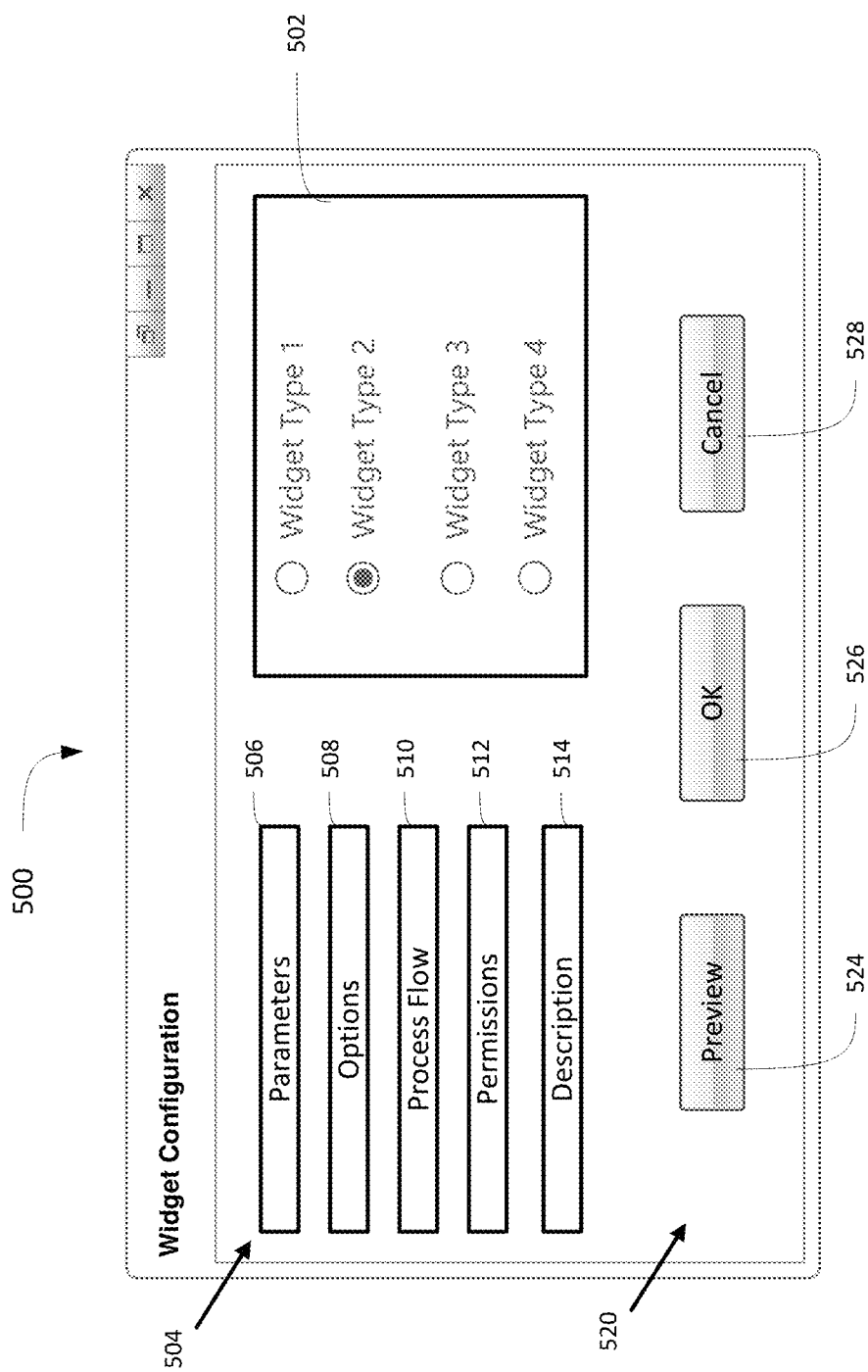
FIG. 5 depicts a user interface for widget selection and configuration according to some embodiments of the present invention.

FIG. 5 depicts a user interface 500 for widget selection and configuration according to some embodiments. The user interface 500 can be accessed based on a user request through widget support 138 or to provide a preconfigured option through the widget suggestion model 146 for further inspection and/or modification. In the example of FIG. 5, the user interface 500 includes a widget type selector 502 and a plurality of configuration selections 504. The configuration selections 504 can have default values based on which widget type is selected through the widget type selector 502. Parameters 506 may define how a selected widget type should be displayed and linked to other components. Options 508 can define whether specific options are enabled or disabled for a selected widget type. Process flow 510 can define how the widget should transition when various responses are received. Permissions 512 can define constraints on accessing systems and data. Description 514 can provide help tips to assist users in understanding how each widget type operates and the intended purpose of the widget. Completion selections 520 can be implemented as buttons or other interfaces to provide a preview 524 of a widget based on the selections currently made through the user interface 500. The completion selections 520 can also include an "OK" or done selection 526 to indicate that the widget configuration is done and ready. Further a "Cancel" selection 528 can close the user interface 500 without modifying or inserting a new widget based on the current widget configuration. Although one example is depicted in FIG. 5, it will be understood that many configuration variations are possible.

Figure 6:
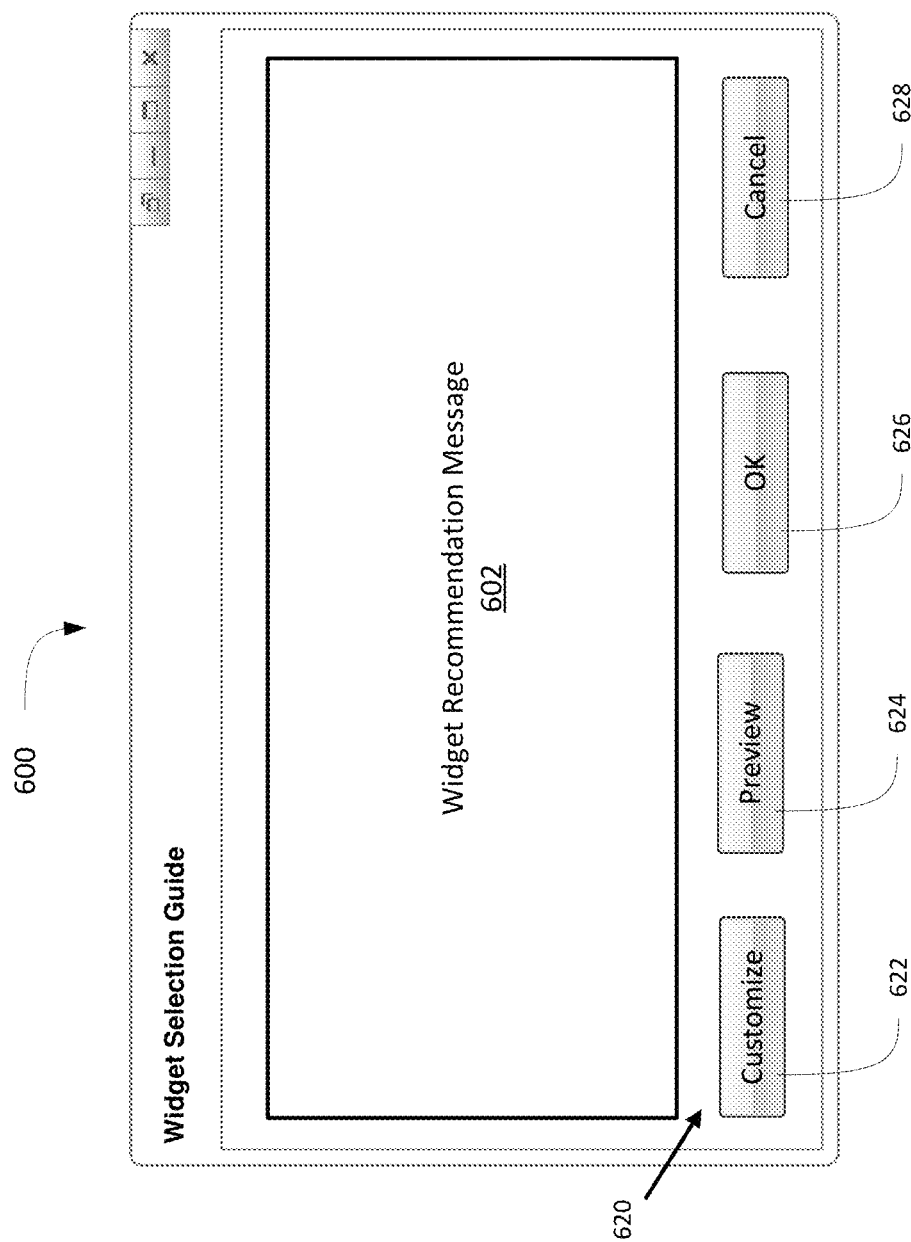
FIG. 6 depicts a widget suggestion interface according to some embodiments of the present invention.

FIG. 6 depicts a widget suggestion interface 600 according to some embodiments. The widget suggestion interface 600 can be triggered, for example, by the widget suggestion model 146 of FIG. 1 to display a widget recommendation message 602. For instance, the widget suggestion model 146 may recommend inserting widget 400A of FIG. 4A as the widget 303 in the email message 300 of FIG. 3 when a single type of product or service is determined to be of potential interest to the recipient. Selection options 620 can include a customize request 622 that can trigger the opening of the user interface 500 of FIG. 5 with suggested values pre-populated. The selection options 620 can also include a preview 624 that illustrates how the widget 303 will appear if the suggestion is accepted. The selection options 620 can further include an "OK" or done selection 626 to indicate that the widget configuration is done and ready. Further a "Cancel" selection 628 can close the widget suggestion interface 600 without modifying or inserting a new widget based on the suggestion along with any customizations. Although one example is depicted in FIG. 6, it will be understood that many variations are possible.

Figure 7:
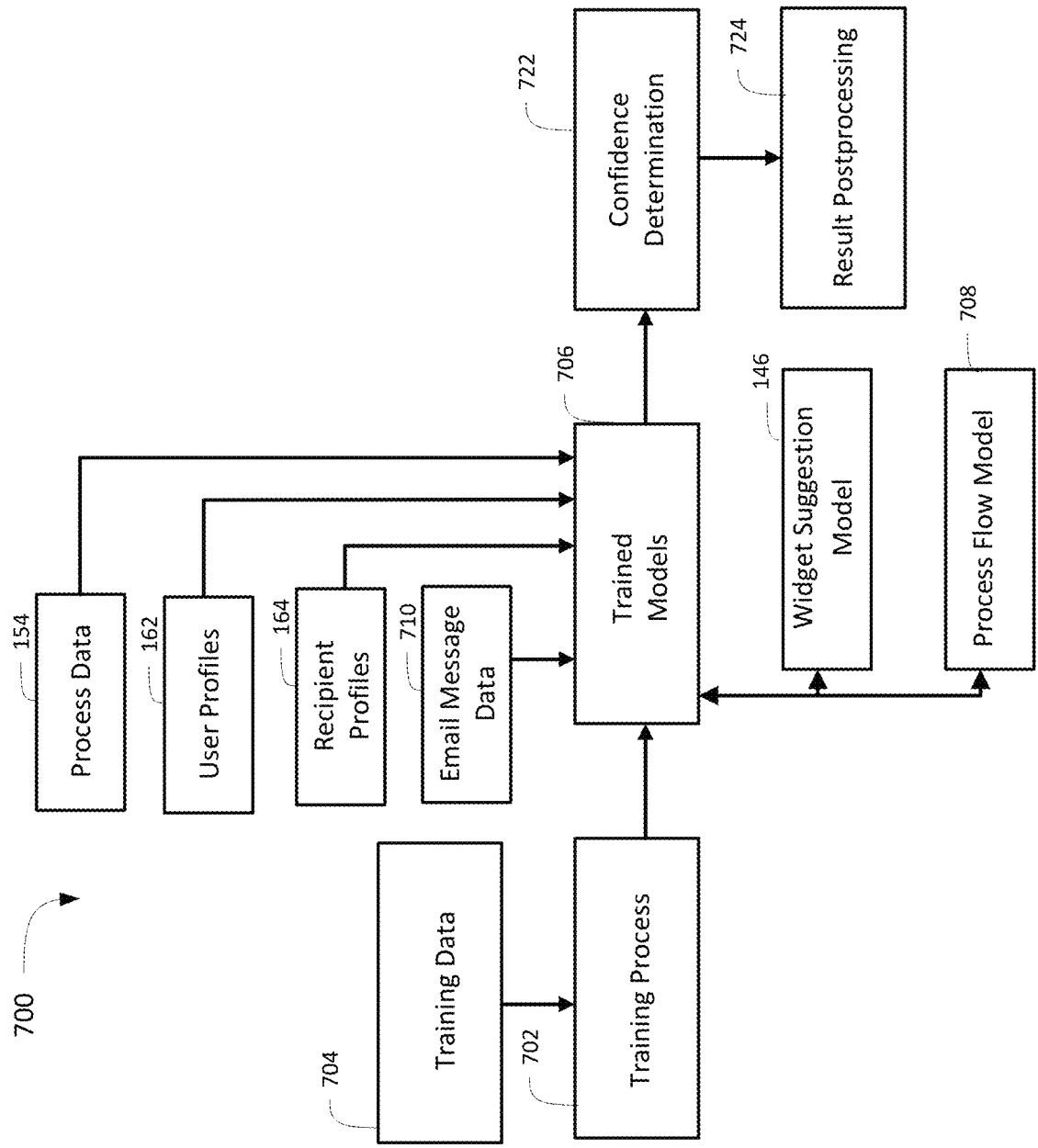
FIG. 7 depicts a model training and usage process according to some embodiments of the present invention.

FIG. 7 depicts a model training and usage process 700 according to some embodiments. The model training and usage process 700 can include a training process 702 that analyzes training data 704 to develop trained models 706, such as the widget suggestion model 146 and/or a process flow model 708. The training process 702 can use labeled or unlabeled data in the training data 704 to learn features, such as a name formats, number formats, date formats, entity relationships, and/or other derived characteristics. The training data 704 can include a set of training data to establish a ground truth for learning coefficients/weights and other such features known in the art of machine learning to develop trained models 706. The trained models 706 can include a family of models to identify specific types of features and make recommendations. Other models and further subdivision of the trained models 706 can be incorporated in various embodiments. The widget suggestion model 146 can learn which widget types and configurations should be used to insert as the widget 303 in an email message 300 of FIG. 3. The process flow model 708 can determine a current point in an interaction process between a user and a recipient that the email message 300 is likely occurring. For example, receiving a quote request for a single product or service, but before completing the transaction, the recipient may be more receptive to learning about multiple options through widget 400C of FIG. 4C. Further, the process flow model 708 can determine conditions for inserting a feedback-type widget rather than another widget type. After a transaction is completed, feedback may be desired through widget 400B of FIG. 4B.

The widget suggestion model 146 can make suggestions, in part, based on the output of the process flow model 708. Various inputs to the trained models 706 can include process data 154, user profiles 162, recipient profiles 164, and/or email message data 710. The email message data 710 can be extracted from portions of the email message 300, such as portions of the header 301, body 302, and attachments 306. Data extraction can be used to parse fields of the correspondence data 305 and provide tagged data values for use by trained models 706.

The trained models 706 can result in a confidence determination 722 associated with process step identification and widget suggestions. As greater details are refined, the trained models 706 can make more accurate process step identifications, leading to higher accuracy widget suggestions. The results of the confidence determination 722 can be further conditioned by result postprocessing 724. The result postprocessing 724 can cross-compare results of the confidence determination 722 to make a final determination of the widget suggestion. The result postprocessing 724 can be tracked in the records 156 to support future machine learning and can trigger the widget suggestion interface 600 of FIG. 6 with the widget recommendation message 602 to be displayed. Thus, a widget suggestion for customizing one or more options can be output by the widget suggestion model 146, and the widget suggestion can be output to a user interface configured to edit the email message 300, where the widget suggestion can be based in-part on a profile of a user editing the email message 300 and/or a profile of the recipient. Although the example of FIG. 7 depicts a particular set of inputs and models, it will be understood that additional inputs and models can be implemented.

Figure 8:
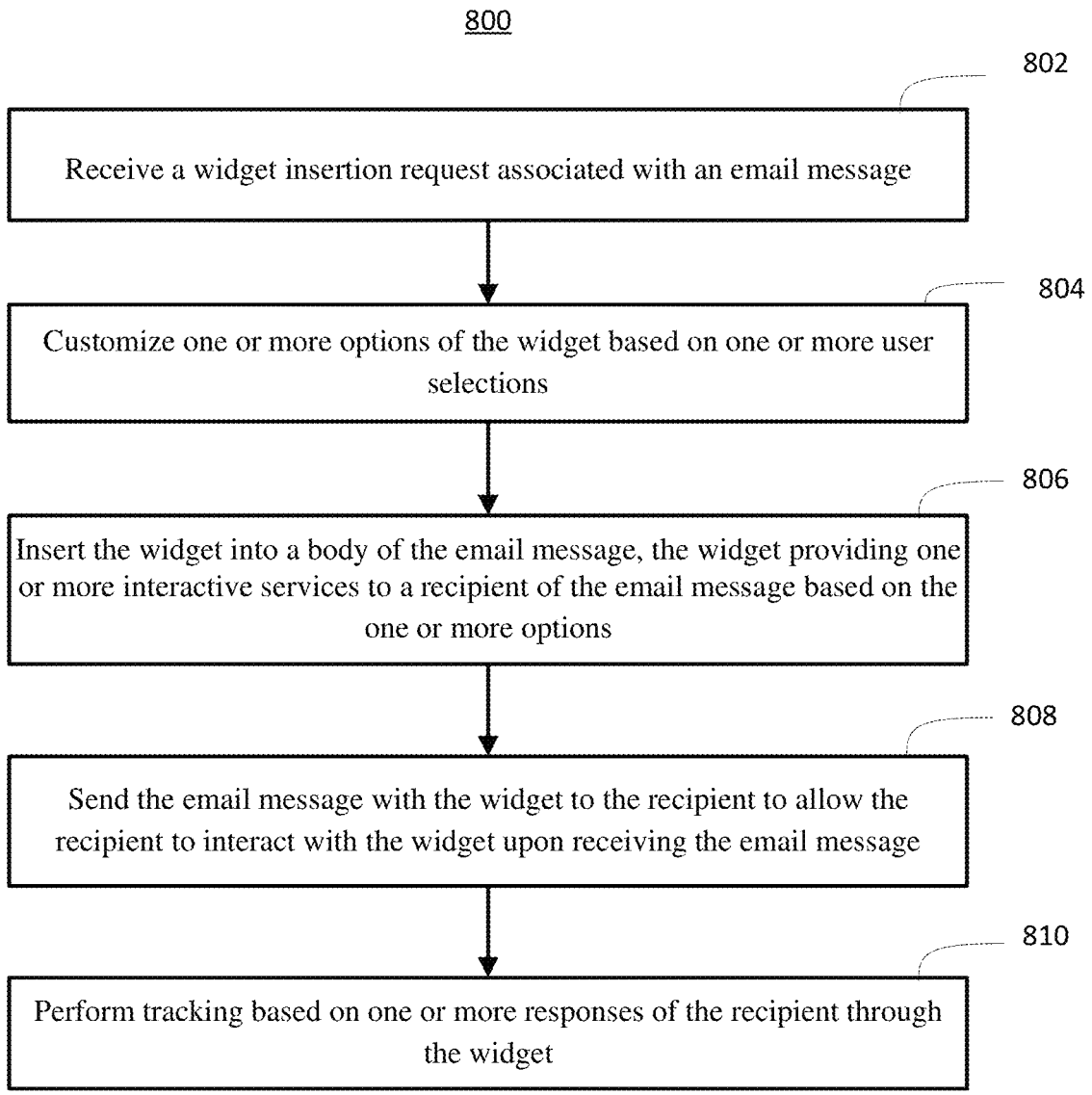
FIG. 8 depicts a widget insertion process according to some embodiments of the present invention.

FIG. 8 depicts a process flow 800 of a widget insertion process according to an embodiment. The process flow 800 includes a number of steps that may be performed in the depicted sequence or in an alternate sequence. Although process flow 800 is illustrated as a sequential flow, various steps of process flow 800 can be selectively performed or omitted in embodiments. The process flow 800 may be performed by the system 100 of FIG. 1. In one embodiment, the process flow 800 is performed by the data processing server 105 of FIG. 1 in combination with the mail server 102, the one or more user systems 106, and/or the one or more data storage servers 110. The process flow 800 is described in reference to FIGS. 1-8.

At step 802, a widget insertion request associated with an email message 300 can be received through widget support 138. The widget insertion request can be initiated by a user or an automated process, such as an insertion request generated through machine learning based on the widget suggestion model 146. At step 804, one or more options of the widget 303 can be customized based on one or more user selections through user interface 500.

At step 806, the widget manager 144 and/or widget support 138 can insert the widget 303 into a body 302 of the email message 300. The widget 303 can provide one or more interactive services to a recipient of the email message 300 based on the one or more options.

At step 808, the email application 136 can send the email message 300 with the widget 303 to the recipient to allow the recipient to interact with the widget 303 upon receiving the email message 300, such as through the email tool 132.

At step 810, the response processing subsystem 142 can perform tracking based on one or more responses of the recipient through the widget 303. In some embodiments, a generation record of the widget 303 can be created as the widget 303 is configured in the email message 300. A response record can be created, for example, by the response processing subsystem 142, capturing data based on one or more responses of the recipient through the widget 303. A follow-up action can be scheduled based on the one or more responses. The generation record, the response record, and a scheduling record of the follow-up action can be stored in a data storage system, such as in records 156 of data storage system 150. A scheduling request can be sent to a targeted entity to perform the follow-up action, such as one of the enterprise entities 111. An outcome of the follow-up action can be tracked. A next action to be performed can be determined based on the outcome of the follow-up action. Once a connection is made through the widget 303 or a component triggered by the widget 303, such as a web page 128, the enterprise entities 111 and/or applications 113 can establish a communication channel back to the widget 303 or web page 128 such that further interactions can be managed with or without use of the response processing subsystem 142.

In embodiments, the widget 303 can be configured to interface with a web application 118 using a unique link to capture one or more responses from the recipient of the email message 300. The widget 303 can combine one or more static user interface elements (e.g., static content 402) with at least one dynamic user interface element (e.g., dynamic content 404) selected based on the one or more options. The at least one dynamic user interface element can interact with a data storage system (e.g., as part of an external server 116 or within the enterprise network zone 101) to select content for presentation to the recipient, such as content 126. The dynamic user interface element can include a video displayed through the widget 303. The widget 303 can be configured to open a web page 128 to present one or more questions to the recipient, based on a selection by the recipient, and capture one or more responses of the recipient. The web page 128 can be configured to send the one or more responses of the recipient as a response email message back to the mail server 102.

Figure 9:
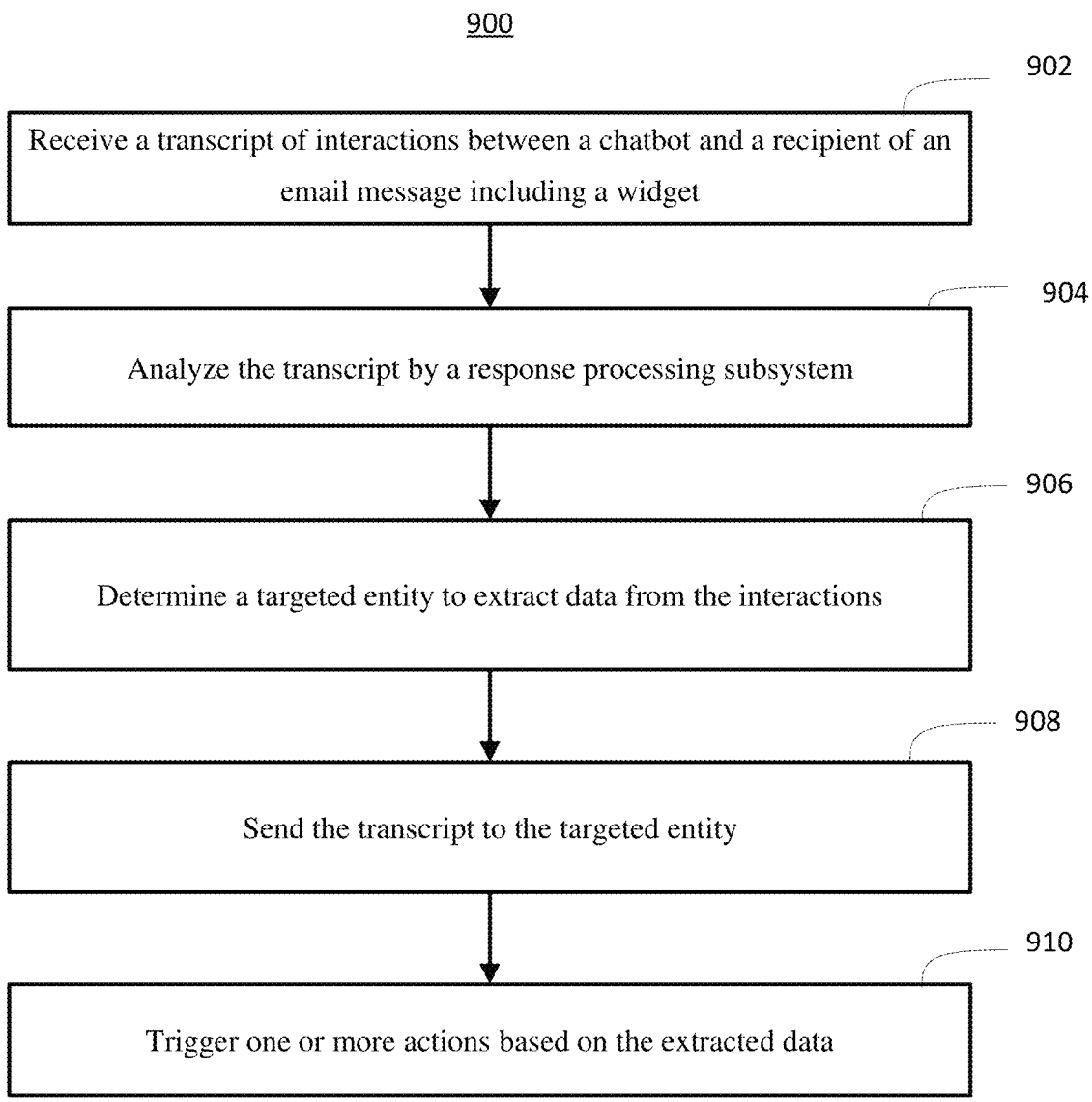
FIG. 9 depicts a chatbot interaction process according to some embodiments of the present invention.

FIG. 9 depicts a process flow 900 of a chatbot interaction and transcription process according to an embodiment. The process flow 900 includes a number of steps that may be performed in the depicted sequence or in an alternate sequence. Although process flow 900 is illustrated as a sequential flow, various steps of process flow 900 can be selectively performed or omitted in embodiments. The process flow 900 may be performed by the system 100 of FIG. 1. In one embodiment, the process flow 900 is performed by the data processing server 105 of FIG. 1 in combination with the mail server 102, the one or more user systems 106, the one or more data storage servers 110, and/or one or more external servers 116. The process flow 900 is described in reference to FIGS. 1-9.

In some embodiments, the widget 303 can be configured to launch a chatbot 120, for example, based on a selection of the recipient of the email message 300. The chatbot 120 can be configured to interface with a transcription service 124 that captures a plurality of interactions between the recipient and the chatbot 120 as a transcript 125 and sends the transcript 125 to a response processing subsystem 142.

At step 902, the response processing subsystem 142 can receive the transcript 125 of interactions between the chatbot 120 and a recipient of an email message 300 including a widget 303. At step 904, the response processing subsystem 142 can analyze the transcript 125. At step 906, the response processing subsystem 142 can determine a targeted entity to extract data from the interactions, such as one or more of the enterprise entities 111. At step 908, the response processing subsystem 142 can send the transcript 125 to the targeted entity. At step 910, the response processing subsystem 142 can trigger one or more actions based on the extracted data. The actions can include, for example, sending a notification to the user application 134 of the results to prompt the user to consider taking further actions.

Figure 10:
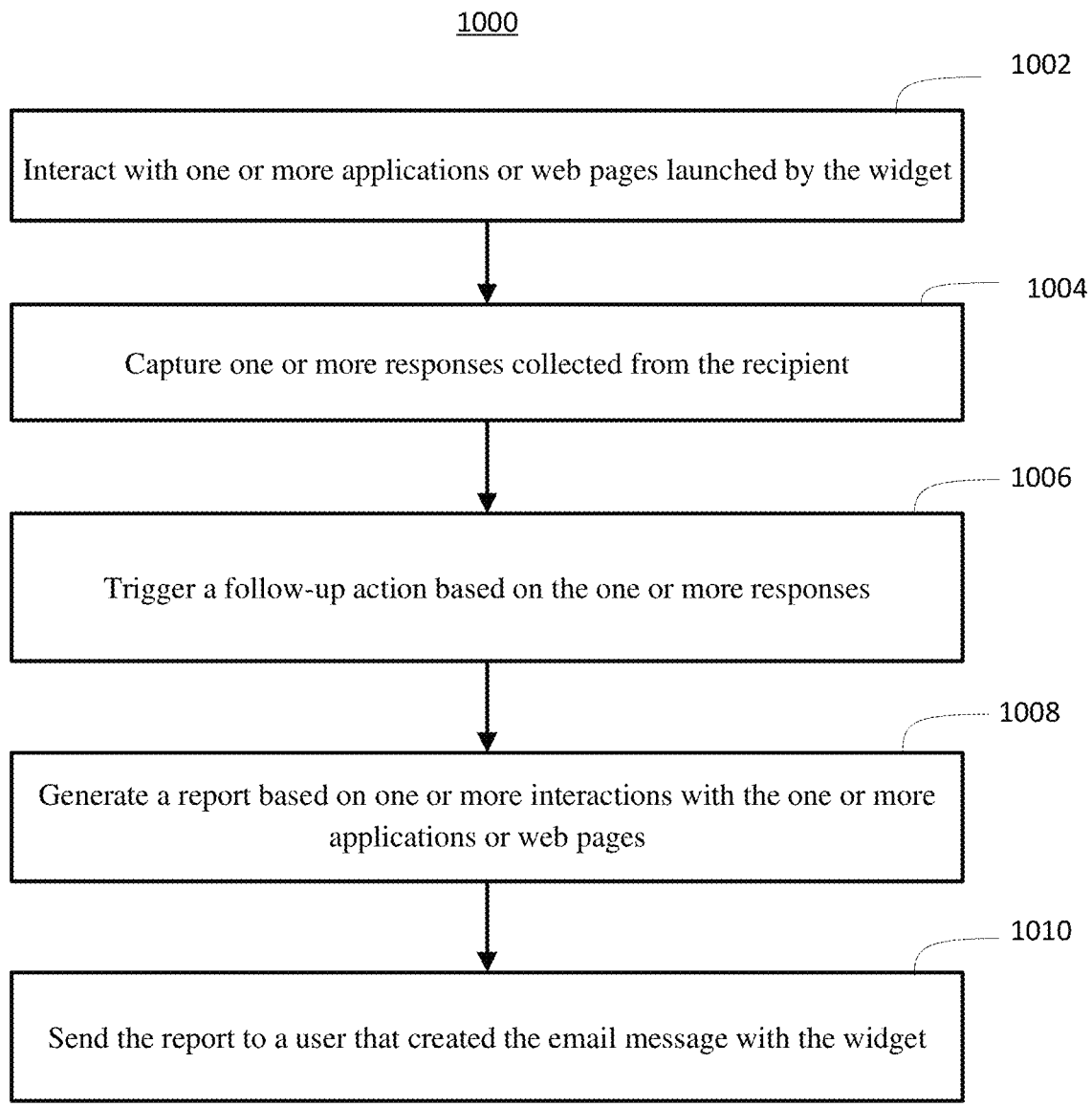
FIG. 10 depicts an application programming interface process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the data processing server 105 of FIG. 1 in combination with the mail server 102, the one or more user systems 106, the one or more data storage servers 110, and/or external servers 116. The process flow 1000 is described in reference to FIGS. 1-10. The API 122 and/or API 140 may perform one or more steps as described herein separately or in combination. For purposes of explanation, reference is made to API 122.

At step 1002, the API 122 can interact with one or more applications (e.g., web application 118) or web pages 128 launched by the widget 303. At step 1004, the API 122 can capture one or more responses collected from the recipient. At step 1006, the API 122 can trigger a follow-up action based on the one or more responses. The follow-up action can include requesting that the recipient be directly contacted or providing information to the applications 113 to take further steps in engaging with the recipient.

At step 1008, the API 122 can generate a report based on one or more interactions with the one or more applications (e.g., applications 113 or web application 118) or web pages 128. At step 1010, the API 122 can send the report to a user that created the email message 300 with the widget 303. The report can be within the body or an attachment to a response email message sent to the mail server 102. The report can provide the status of interactions of the recipient with respect to other components that the user may not otherwise be able to directly observe.

Figure 11:
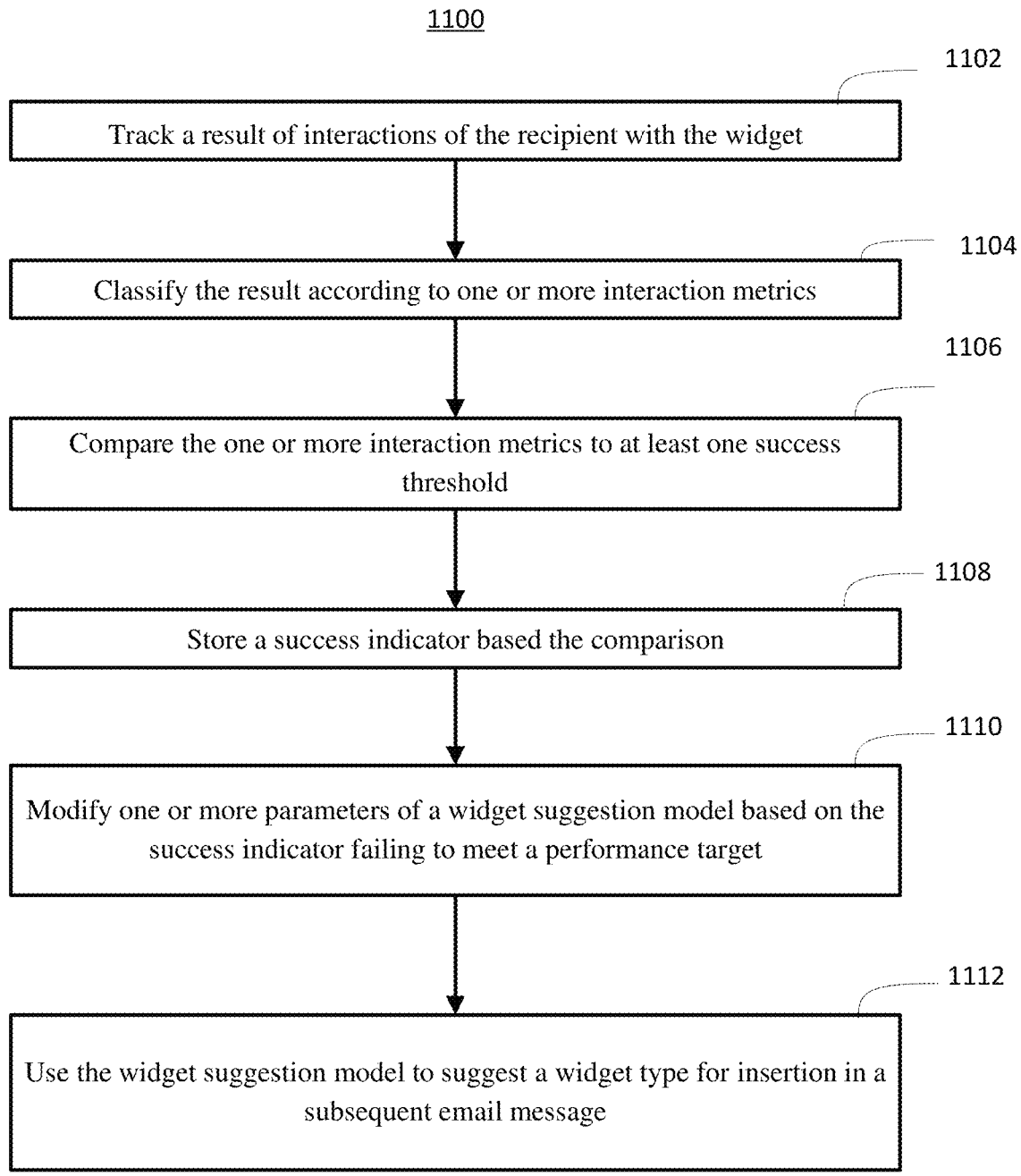
FIG. 11 depicts a widget suggestion model update process according to some embodiments of the present invention.

Turning now to FIG. 11, a process flow 1100 of a widget suggestion model update process is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the data processing server 105 of FIG. 1 in combination with the mail server 102, the one or more user systems 106, the one or more data storage servers 110, and/or external servers 116. The process flow 1100 is described in reference to FIGS. 1-11.

At step 1102, the response processing subsystem 142 can track a result of interactions of the recipient with the widget 303. At step 1104, the response processing subsystem 142 can classify the result according to one or more interaction metrics (e.g., as captured in metrics 158). At step 1106, the response processing subsystem 142 can compare the one or more interaction metrics to at least one success threshold.

At step 1108, the response processing subsystem 142 can store a success indicator based the comparing. A widget suggestion model 146 configured to suggest a widget type for insertion in the email message 300 can be accessed. At step 1110, one or more parameters of the widget suggestion model 146 can be modified based on the success indicator failing to meet a performance target. At step 1112, the widget suggestion model 146 can be used to suggest a widget type for insertion in a subsequent email message. The success indicator can be used to continue to train the widget suggestion model 146 to optimize toward combinations that have a higher level of success.

Technical effects include widget insertion in email that supports static and dynamic content with additional user interface elements to expand data collection and trigger interaction with other systems. Widget configuration and selection can be customized by a sender of the email message and/or suggested and inserted through an automated process.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
a processing device; and
a memory device in communication with the processing device, the memory device storing instructions that when executed by the processing device result in:
receiving a widget insertion request associated with an email message;
generating a widget suggestion for customizing one or more options of the widget, wherein the widget suggestion is based on a role defined in a profile of a user editing the email message and/or a role defined in a profile of the recipient;
outputting the widget suggestion to a user interface configured to edit the email message;
customizing the one or more options of the widget based on the one or more user selections;
inserting the widget into a body of the email message, the widget providing one or more interactive services to a recipient of the email message based on the one or more options, wherein the widget triggers one or more subsequent interactions between a recipient system and an application or service through a network and passes data from the widget to the application or service absent direct input of the data by the recipient into the application or service; and
sending the email message with the widget to the recipient to allow the recipient to interact with the widget upon receiving the email message.

2. The system of claim 1, wherein the widget is configured to interface with a web application using a unique link to capture one or more responses from the recipient of the email message.

3. The system of claim 1, wherein the widget combines one or more static user interface elements with at least one dynamic user interface element selected based on the one or more options.

4. The system of claim 3, wherein the at least one dynamic user interface element interacts with a data storage system to select content for presentation to the recipient.

5. The system of claim 3, wherein the at least one dynamic user interface element comprises a video displayed through the widget.

6. The system of claim 1, wherein the widget is configured to open a web page to present one or more questions to the recipient, based on a selection by the recipient, and capture one or more responses of the recipient.

7. The system of claim 6, wherein the web page is configured to send the one or more responses of the recipient as a response email message.

8. The system of claim 1, wherein the widget is configured to launch a chatbot.

9. The system of claim 8, wherein the chatbot is configured to interface with a transcription service that captures a plurality of interactions between the recipient and the chatbot as a transcript and sends the transcript to a response processing subsystem.

10. The system of claim 9, wherein the response processing subsystem is configured to:
analyze the transcript;
determine a targeted entity to extract data from the interactions; and
send the transcript to the targeted entity.

11. The system of claim 1, further comprising an application programming interface configured to:
interact with one or more applications or web pages launched by the widget;
capture one or more responses collected from the recipient;
trigger a follow-up action based on the one or more responses; and
generate a report based on one or more interactions with the one or more applications or web pages.

12. The system of claim 1, wherein the widget is configured to open a sequence of web pages that is dynamically selected based on one or more responses by the recipient.

13. The system of claim 1, further comprising instructions that when executed by the processing device result in:
creating a generation record of the widget as configured in the email message;
creating a response record capturing data based on one or more responses of the recipient through the widget;
scheduling a follow-up action based on the one or more responses; and
storing the generation record, the response record, and a scheduling record of the follow-up action in a data storage system.

14. The system of claim 13, further comprising instructions that when executed by the processing device result in:
sending a scheduling request to a targeted entity to perform the follow-up action;
tracking an outcome of the follow-up action; and
determining a next action to be performed based on the outcome of the follow-up action.

15. The system of claim 1, further comprising instructions that when executed by the processing device result in:
tracking a result of interactions of the recipient with the widget;
classifying the result according to one or more interaction metrics;
comparing the one or more interaction metrics to at least one success threshold; and
storing a success indicator based the comparing.

16. The system of claim 15, further comprising instructions that when executed by the processing device result in:
accessing a widget suggestion model configured to suggest a widget type for insertion in the email message; and
modifying one or more parameters of the widget suggestion model based on the success indicator failing to meet a performance target.

17. The system of claim 1, wherein a sender identifier in a header of the email message is used to perform a lookup of the profile of the user editing the email message to determine the role of the user and one or more access constraints.

18. The system of claim 1, wherein a recipient identifier in a header of the email message is used to perform a lookup of the profile of the recipient to determine the role of the recipient and one or more access constraints.

19. A computer program product comprising a storage medium embodied with computer program instructions that when executed by a computer cause the computer to implement:
receiving a widget insertion request associated with an email message;
generating a widget suggestion for customizing one or more options of the widget, wherein the widget suggestion is based on a role defined in a profile of a user editing the email message and/or a role defined in a profile of the recipient;
outputting the widget suggestion to a user interface configured to edit the email message;
customizing the one or more options of the widget based on the one or more user selections;
inserting the widget into a body of the email message, the widget providing one or more interactive services to a recipient of the email message based on the one or more options, wherein the widget triggers one or more subsequent interactions between a recipient system and an application or service through a network and passes data from the widget to the application or service absent direct input of the data by the recipient into the application or service; and
sending the email message with the widget to the recipient to allow the recipient to interact with the widget upon receiving the email message.

20. The computer program product of claim 19, wherein the widget is configured to interface with a web application using a unique link to capture one or more responses from the recipient of the email message.

21. The computer program product of claim 19, wherein the widget is configured to:
open a web page to present one or more questions to the recipient, based on a selection by the recipient;
capture one or more responses of the recipient; and
send the one or more responses of the recipient as a response email message.

22. The computer program product of claim 19, wherein the widget is configured to launch a chatbot configured to interface with a transcription service that captures a plurality of interactions between the recipient and the chatbot as a transcript and sends the transcript to a response processing subsystem.

23. The computer program product of claim 19, further comprising computer program instructions that when executed by the computer cause the computer to implement:
creating a generation record of the widget as configured in the email message;
creating a response record capturing data based on one or more responses of the recipient through the widget;
scheduling a follow-up action based on the one or more responses; and
storing the generation record, the response record, and a scheduling record of the follow-up action in a data storage system.

24. The computer program product of claim 23, further comprising computer program instructions that when executed by the computer cause the computer to implement:
sending a scheduling request to a targeted entity to perform the follow-up action;
tracking an outcome of the follow-up action; and
determining a next action to be performed based on the outcome of the follow-up action.

25. The computer program product of claim 19, further comprising computer program instructions that when executed by the computer cause the computer to implement:
tracking a result of interactions of the recipient with the widget;
classifying the result according to one or more interaction metrics;
comparing the one or more interaction metrics to at least one success threshold;
storing a success indicator based the comparing;
accessing a widget suggestion model configured to suggest a widget type for insertion in the email message; and
modifying one or more parameters of the widget suggestion model based on the success indicator failing to meet a performance target.

26. The computer program product of claim 19, wherein a sender identifier in a header of the email message is used to perform a lookup of the profile of the user editing the email message to determine the role of the user, and a recipient identifier in the header of the email message is used to perform a lookup of the profile of the recipient to determine the role of the recipient.

* * * * *